C. C. RICH.
HYDRAULIC TRANSMISSION MECHANISM.
APPLICATION FILED JULY 23, 1910.

1,156,818.

Patented Oct. 12, 1915.
2 SHEETS—SHEET 1.

Inventor
C. C. Rich

Witnesses

C. C. RICH.
HYDRAULIC TRANSMISSION MECHANISM.
APPLICATION FILED JULY 23, 1910.

1,156,818.

Patented Oct. 12, 1915.

Witnesses

Inventor
C. C. Rich
By Attorneys

UNITED STATES PATENT OFFICE.

CHARLES C. RICH, OF MOUNT VERNON, NEW YORK, ASSIGNOR TO THE HYDRO-KINETIC TRANSMISSION COMPANY, OF MOUNT VERNON, NEW YORK, A CORPORATION OF MAINE.

HYDRAULIC TRANSMISSION MECHANISM.

1,156,818.  Specification of Letters Patent.  Patented Oct. 12, 1915.

Application filed July 23, 1910. Serial No. 573,568.

*To all whom it may concern:*

Be it known that I, CHARLES C. RICH, a citizen of the United States, residing at Mount Vernon, in the county of Westchester and State of New York, have invented certain new and useful Improvements in Hydraulic Transmission Mechanism, of which the following is a specification.

This invention comprehends certain new and useful improvements in hydraulic transmission mechanisms of the character disclosed in my co-pending applications, Serial Nos. 573,566, filed July 23, 1910, and 573,567 filed of like date, and is specially designed for use in connection with automobiles, motor trucks or other self-propelled vehicles, although it is to be understood that the invention is not limited to this use, but is applicable generally for transmitting power from a drive to a driven shaft.

The present invention has for its primary object an improved construction and arrangement of parts, in a mechanism of this type, whereby the weight will be evenly distributed, vibration reduced to a minimum and the parts close-coupled and rigid.

With this and other objects in view as will more fully appear as the description proceeds, the invention consists in certain constructions, arrangements and combinations of the parts that I shall hereinafter fully describe and claim.

Figure 1:
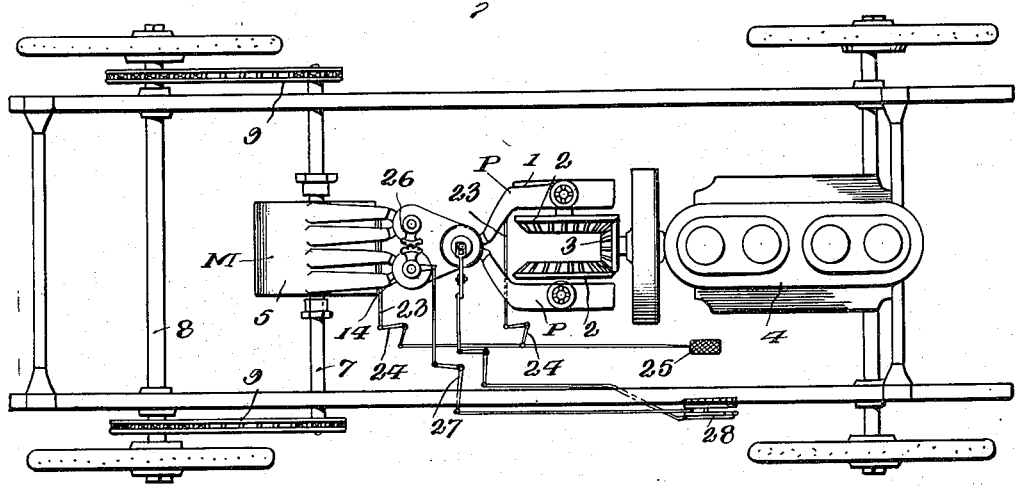
Figure 2:
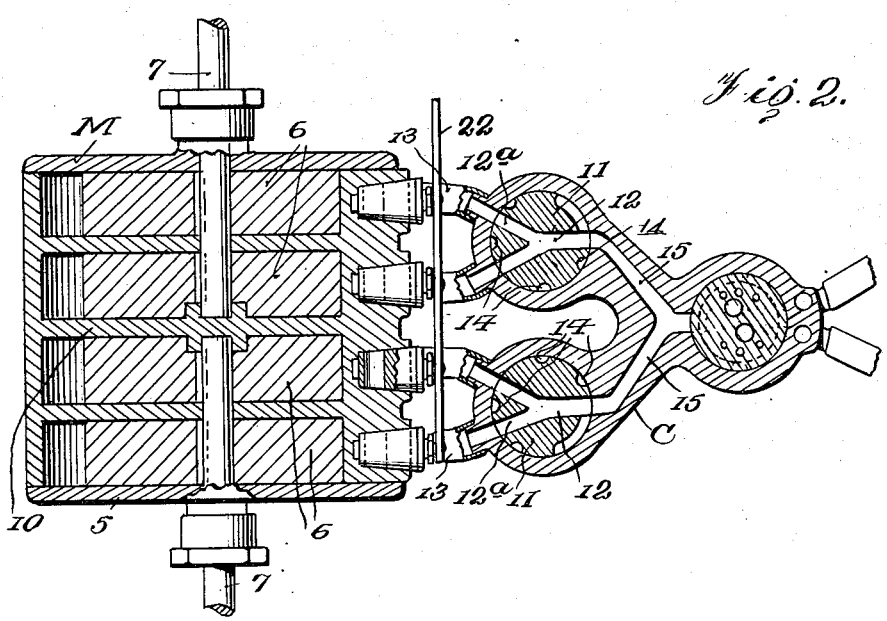
Figure 3:
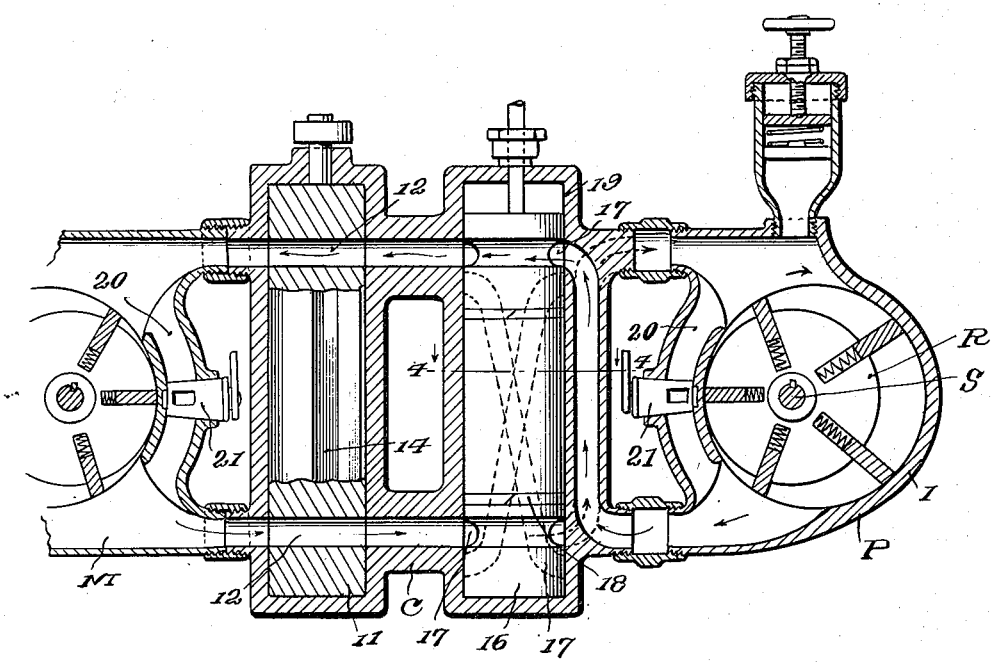
Figure 4:
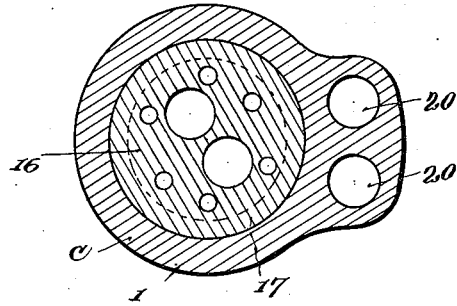

For a full understanding of the invention, reference is to be had to the following description and accompanying drawings, in which:

Figure 1 is a top plan view of the framework or running gear of a motor vehicle, the same being illustrated conventionally and showing the disposition of one embodiment of the invention; Fig. 2 is a horizontal sectional view through a portion of the motors and the valve mechanism; Fig. 3 is a vertical longitudinal sectional view on an enlarged scale; and, Fig. 4 is a horizontal sectional view of the reversing valve, the section being taken substantially on the line 4—4 of Fig. 3.

Corresponding and like parts are referred to in the following description and indicated in all the views of the drawings by the same reference characters.

In this embodiment of the invention, I provide two pumps P of the rotary type, the pumps being arranged one along side of the other in spaced relation to each other, and each containing a rotor R secured on a shaft S.

1 designates the casings of the respective pumps.

The adjoining or inner ends of the shafts S have secured thereon, in spaced relation to each other, bevel gear wheels 2 which face as shown and extend parallel, both of said bevel gear wheels 2 meshing with an interposed bevel pinion 3 secured to the drive shaft of the gasolene engine 4 or other prime mover.

5 designates the casing of the motor M, said motor being quadruple, and divided into two pairs of compartments with a rotor 6 in each compartment. Each pair of rotors 6 is keyed or otherwise secured to a section 7 of a shaft which may be any shaft to receive the transmitted power, the present embodiment of the invention illustrating this shaft as a countershaft connected to the rear axle 8 of the vehicle by drive chains 9.

It will thus be understood that there are in effect four hydraulic motors arranged in two pairs, although all housed in the same casing, and that the adjoining sections of the countershaft 7 terminate in alinement with each other in bearing sockets formed in the main middle partition 10 of said casing. One pair of rotors 6 may be obviously turned independently of the other and thereby secure a differential action, thus doing away entirely with the necessity of differential gears.

In order to control both pairs of hydraulic motors, I have provided two valves 11 mounted in a casing C, each of said valves being formed near its ends with transversely extending passages 12 that are branched out at one end, as indicated at 12ª.

13 designates the ports which lead to and from the respective motors, said ports being controlled by the valves 11, in an effective manner.

In that position of the valves illustrated in Fig. 2, it will be understood that the motive fluid is passing from the two pumps P to both pairs of motors and back again, all of the rotors 6 being thereby acted upon and the force of the fluid being distributed whereby considerable power is secured, but a relatively slow speed. By turning the valves 11 to a position where the ends of the passages 12, 12ª, will be closed by the walls of the casing C, the longitudinally extending peripheral grooves 14 will be brought opposite the ports 13 and the branch ends 15 of the passages that lead through the casing C from and to the valves and pumps, so that the inlet and outlet ports of all of the motors will be bridged, as well as the upper and lower branch passages 15, and the two pumps and all of the motors will be permitted to run free but will be entirely disconnected from each other. This is, of course, the neutral position of the parts. By giving the valves 11 another turn, the passages 12, 12$^a$, will establish communication between the ports of the outermost motors and the said branched passages 15, while at the same time the ports of the innermost motors will be bridged to permit said last named motors to run free without any operative connection whatever with the branched passages 15. Hence, as is evident in this last named position of the valves, the motive fluid will be passed to and from the pumps P and the outermost motors only, and the full force of the fluid will be exerted upon said outermost motors, whereby to obtain a relatively high speed. The outermost motors are always in commission when the parts are operating, and this is manifestly an advantage, as it serves to reduce lateral and torsional strain on the shaft sections 7 to a minimum.

In connection with the two speed controlling valves 11, there is embodied in the casing C a reversing valve 16 which is in the form of a piston mounted within a cylindrical chamber and arranged for a limited longitudinal movement therein. This piston is formed in its ends with annular peripheral grooves 17 and is additionally provided with obliquely extending cross passages 18. When the piston 16 is in the position illustrated in Fig. 3, it is clear that the motive fluid can pass directly from and to the pump P and through the controlling valves 11, but when the piston is raised to a position which will bring the ends of the cross passages 18 into registry with the ports that are formed in the walls of the chamber 19 which receives the piston, the direction of flow will be reversed and consequently the motors will be turned rearwardly.

Manifestly, the disposition of the two pumps P and the gear connections of their rotor shafts with the drive shaft of the prime mover, causes said rotor shafts to turn in opposite directions and to compensate for this so that the motive fluid as it passes to and from both pumps, will flow in the same direction relative to one pump as to the other, the casing C is formed at one side with oppositely extending reversing passages 20, as best illustrated in Figs. 3 and 4.

As set forth particularly in one of my companion applications Serial No. 653,681 filed October 9, 1911, (Case C), my invention provides by-pass passages 20$^a$ in the pumps as well as the motors, said by-pass passages being controlled by plugs or cocks 21, or similar accessories under the control of the operator. In the present instance, all of the plugs 21 are provided with handles by which they may be turned, and the handle of the motor plugs are connected together by a common link bar 22. The handles of the pump plugs are similarly connected by a link bar 23. Both of these link bars are connected to bell cranks 24, and said bell cranks are operated by a foot treadle 25. By this means it is evident that all of the plugs may be turned in a direction to open the by-pass passages 20, whereupon the fluid will be merely circulated within the respective housings and all operative connection between the pumps and motors will be rendered inactive. By this arrangement of parts, as more specifically described in my companion application before referred to, operative connection between the pumps and motors may be broken or established at will, without the necessity of moving the speed controlling valves 11 to their neutral position.

The valves 11 may be simultaneously operated in any desired way, as by toothed segments 26 meshing with each other and mounted on the upper ends or stems of the valves, one of said segments being connected by a link to a bell crank 27 and the latter in turn connected to a hand lever 28.

From the foregoing description in connection with the accompanying drawing, it will be understood that in the operation of my improved hydraulic transmission mechanism, the simultaneous manipulation of the speed controlling valves 11 may cause the two pumps P to drive all of the four motors M simultaneously, that by turning the valves to a certain position, the adjoining motors of the set may be permitted to run free, while the entire force of the fluid acts upon the outermost motors of the set, that although the pumps are turning in opposite directions, they both effect circulation of the motive fluid in the same direction, and that the motors may be easily reversed or the pumps entirely disconnected from the motors in an operative sense by the action of the piston 16 or the manipulation of the plug valves 21 without the necessity of shifting the speed controlling valves.

By mounting all of the valves in the same casing as best illustrated in Fig. 2, not only is it possible to couple the parts closely, but the casing serves as an effective brace between the pump casings and the casings of the motors, the parts being rendered very rigid and free from vibration. It will also be observed that the pumps are closely connected to the motors and to the prime mover 4 and that all piping between the parts is practically eliminated, while at the same time the passages are relatively free from waste and friction and the setting up of eddies is to a considerable extent eliminated.

Having thus described the invention, what is claimed as new is:

1. In hydraulic transmission mechanism, the combination of pumping mechanism, a plurality of hydraulic motors, the pumping mechanism being set with its ports facing the ports of the motors, a single valve casing interposed between the pumping mechanism and the motors and closely coupled directly thereto in communication with the ports thereof, speed controlling valves mounted in said casing and operable to pass the fluid to and from the pumping mechanism and the motors simultaneously and to also pass the motive fluid from and to the pumping mechanism, and to sundry of said motors independently of the others, whereby to secure different speeds, and a single reversing valve also embodied in the same casing with the speed controlling valves and interposed between the latter and the pumping mechanism, so as to control the direction of flow of the motive fluid to and from the speed controlling valves and also through the same to the motors.

2. In hydraulic transmission mechanism, the combination of pumping mechanism, a plurality of sets of hydraulic motors, a single valve casing interposed between the pumping mechanism and the sets of motors, having a portion disposed directly opposite each set of motors and in communication with the ports thereof, speed controlling valves mounted in said casing and operating to pass fluid to and from the pumping mechanism and the motors simultaneously and to also pass the motive fluid from and to the pumping mechanism, and to certain of said motors independently of the other motors whereby to secure different speeds, and a single reversing valve mounted in the same casing with the speed controlling valves and interposed between the latter and the pumping mechanism to control the direction of flow of the motive fluid to and from the speed controlling valves and also through the same to the motors.

3. In hydraulic transmission mechanism, the combination with pumping mechanism, of opposed shaft sections, a plurality of motors mounted on each of said shaft sections, means for directing fluid from the pumping mechanism in one direction through all of the motors on each shaft or through certain of the motors on each shaft, and means for reversing the direction of movement of the flow through said motors.

4. In hydraulic transmission mechanism, a pair of pumps, bevel gear wheels disposed between said pumps for operating the same, a prime mover engaging both of said gear wheels, a plurality of sets of hydraulic motors, each set comprising a plurality of motors, means for directing fluid from both of said pumps in one direction through all of the motors of both sets, or through certain of the motors of both sets, and means for reversing the direction of movement of the flow through said motors.

5. In hydraulic transmission mechanism, the combination with pumping mechanism, of two pairs of hydraulic motors, two valve chambers, one for each pair of motors, each valve chamber having two pairs of passages extending one pair to each of the motors of a pair, valves one in each valve chamber adapted to direct fluid either into both motors connected thereto or only into one of said motors, a reversing valve chamber having ducts leading therefrom to the first named valve chambers, and having a duct leading therefrom to the pumping mechanism, and a valve in said chamber for reversing the flow of motive fluid through the motors.

In testimony whereof, I affix my signature in presence of two witnesses.

CHARLES C. RICH. [L. S.]

Witnesses:
 W. N. WOODSON,
 FREDERICK S. STITT.